No. 692,613. Patented Feb. 4, 1902.
Z. T. BUSH.
VEHICLE SPRING.
(Application filed Aug. 2, 1901.)
(No Model.)

WITNESSES:
Jas. A. Ryan
Perry B. Turpin

INVENTOR
Zachariah T. Bush
BY Munn & Co.
ATTORNEYS

THE NORRIS PETERS CO., PHOTO-LITHO., WASHINGTON, D. C.

UNITED STATES PATENT OFFICE.

ZACHARIAH T. BUSH, OF GRANDLEDGE, MICHIGAN.

VEHICLE-SPRING.

SPECIFICATION forming part of Letters Patent No. 692,613, dated February 4, 1902.

Application filed August 2, 1901. Serial No. 70,611. (No model.)

*To all whom it may concern:*

Be it known that I, ZACHARIAH T. BUSH, a citizen of the United States, residing at Grandledge, in the county of Eaton and State of Michigan, have invented a new and Improved Vehicle-Spring, of which the following is a specification.

My invention is an improvement in vehicle-springs, and has for an object to provide a simple novel construction by which to secure a considerable length of spring within a given space by forming scrolls at the ends and by leaving the center of the springs free, and also to provide a novel construction of spring-bar supporter at the center of the spring, as shown; and the invention consists in certain novel constructions and combination of parts, as will be hereinafter described and claimed.

Figure 1:
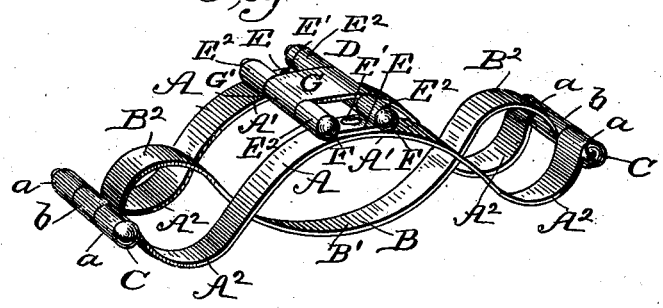
Figure 2:
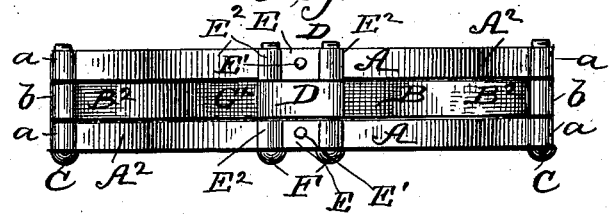
Figure 3:
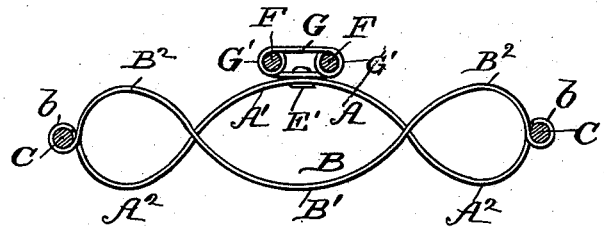
Figure 4:
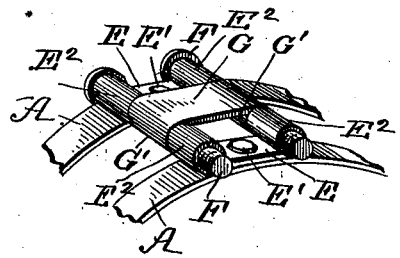

In the drawings, Figure 1 is a perspective view of my spring. Fig. 2 is a top plan view thereof. Fig. 3 is a longitudinal section of the spring; and Fig. 4 is a detail perspective view, enlarged, showing the spring-bar supporter and the portions of the outside springs immediately connected therewith.

My spring is formed with the end springs or bars A and the intermediate spring or bar B. Said springs are provided at their ends with returned portions $a$ and $b$, which form eyes for the end bolts C, which connect the end springs and the intermediate spring, as shown in the drawings.

The end springs are bowed outwardly at their middles at A' and are also bowed reversely near their ends at $A^2$, while the intermediate spring is bowed outwardly at B' at its middle reversely to the portions A' of the end springs, while its end portions $B^2$ are bowed outwardly reversely to the intermediate portion B' of the intermediate spring and the end portions $A^2$ of the end springs. By this construction I secure a spring whose bars have a great length within a given space, in which the end springs and the intermediate spring cross each other at points between the center and outer ends of the springs and in which the end springs extend on opposite sides of the intermediate spring, as shown in the drawings. The spring-bar supporter D, as best shown in Figs. 1, 2, and 4, includes the end bars E, which are secured between their ends to the end springs at E' and are provided at their ends with the upwardly-turned portions $E^2$, forming the eyes for the bolts F, which unite the opposite plates E and secure between them the connecting-plate G, which is arranged between the plates E and has at its ends the downwardly-turned portions forming the eyes G' for the passage of the connecting-bolts F, as shown. This plate G is fitted against and secured to the spring-bar in any desired manner, and in addition to forming a convenient means of connection with the spring-bar this construction operates to unite the end springs at their centers in such manner as to avoid any interference with the elasticity of the springs, which are left free to operate elastically from end to end, as desired.

Having thus described my invention, what I claim as new, and desire to secure by Letters Patent, is—

1. A vehicle-spring substantially as herein described consisting of the end springs, provided at their centers with the outwardly-bowed portions and near their ends with the outwardly-bowed portions curved reversely to the said central portions, the intermediate spring arranged between the end springs and having at its center the outwardly-bowed portion arranged reversely to the center portions of the end springs, and provided at its ends with the outwardly-bowed portions which are arranged reversely to the end portions of the end springs, the devices connecting the ends of the end and intermediate springs, and the spring-bar supporter comprising the bars secured upon the end springs at their centers, and having the end eyes, the intermediate bar arranged between said bars and provided at its ends with eyes, and the connecting-bolts passing through the eyes of the said bars, all substantially as and for the purposes set forth.

2. The combination in a vehicle-spring of the intermediate spring, the end springs bowed outwardly at their middles, and the spring-bar supporter consisting of the bars secured between their ends to the end springs, the bar intermediate the said end spring-bars, and devices connecting the said bars at their ends, substantially as set forth.

3. In a vehicle-spring the combination of the end springs, the intermediate spring, said end and intermediate springs being bowed outwardly at their middles in reverse directions, the bars secured at their middles upon the outwardly-bowed portions of the end springs and provided with the end eyes, the bar between the said bars and having the end eyes coinciding with those of the end bars, and the bolts passing through said eyes, substantially as and for the purpose set forth.

ZACHARIAH T. BUSH.

Witnesses:
W. R. CLARKE,
R. A. LATTING.